United States Patent [19]

Nabae et al.

[11] Patent Number: 5,017,337

[45] Date of Patent: May 21, 1991

[54] ALUMINUM ALLOY FOR MAGNETIC DISC SUBSTRATE EXECELLENT IN PLATABILITY

[75] Inventors: Motohiro Nabae; Kunihiko Kishino, both of Nikko, Japan

[73] Assignee: Furukawa Aluminum Co., Ltd., Tokyo, Japan

[21] Appl. No.: 412,431

[22] Filed: Sep. 26, 1989

[30] Foreign Application Priority Data

Sep. 30, 1988 [JP] Japan .................. 63-246726

[51] Int. Cl.$^5$ .............................. C22C 21/06
[52] U.S. Cl. .................... 420/532; 148/439
[58] Field of Search .............. 420/532; 148/439

[56] References Cited

U.S. PATENT DOCUMENTS 4,431,461 2/1984 Hoshino et al. ............. 148/2

Primary Examiner—R. Dean
Assistant Examiner—Robert R. Koehler
Attorney, Agent, or Firm—Breiner & Breiner

[57] ABSTRACT

An aluminum alloy for magnetic disc substrate excellent in platability is disclosed, which is characterized in that not less than 0.010 wt. % and under 0.03 wt. % of Cu, not less than 2 wt. % and not more than 6 wt. % of Mg and not less than 0.05 wt. % and not more than 2.0 wt. % of Zn are contained, further one or more of over 0.01 wt. % and under 0.05 wt. % of Mn and over 0.01 wt. % and under 0.05 wt. % of Cr are contained, and, as impurity elements, Si, Fe, Ti and other individual unavoidable element are regulated to be not more than 0.1 wt. %, not more than 0.1 wt. %, not more than 0.02 wt. % and not more than 0.02 wt. %, respectively. Zr may be contained additionally in amounts of not less than 0.005 wt. % and under 0.05 wt. %.

2 Claims, 1 Drawing Sheet

Cu: 0%

Cu: 0.02%

Cu: 0.05%

Cu: 0.15%

ALUMINUM ALLOY FOR MAGNETIC DISC SUBSTRATE EXECELLENT IN PLATABILITY

BACKGROUND OF THE INVENTION

The present invention relates to an aluminum alloy for magnetic disc substrate and, in particular, to the aluminum alloy excellent in the platability, which improves the adhesion of electroless plating in the priming plating, smoothness of plated surface, etc.

For the magnetic disc used for the recording device of electronic computer, such one as covered the surface of substrate comprising aluminum alloy with magnetic substance is generally used. Such magnetic disc is produced in a way that, after the substrate was machined to a fixed thickness and the surface was polished mirror-like, a mixture of powder of magnetic substance with powder or resin is coated, and then heat treatment is carried out to form the film of magnetic substance.

Recently, large capacity and high density have become to be required for the magnetic disc. Thus, the magnetic domain per bit of magnetic disc is being made more and more minute and, at the same time, the clearance between magnetic head and magnetic disc has also become necessary to be decreased. As a result, requirements to make thinner and to improve the wear resistance have arisen also for the film of magnetic substance. For this reason, a magnetic disc is proposed, wherein, after the substrate was machined to a fixed thickness and the surface was processed mirror-like, a hard nonmagnetic metal, for example, Ni-P is plated electrolessly as a primer for covering with magnetic substance, and than a magnetic substance, for example, Co-Ni-P alloy is coated by sputtering or plating.

For such magnetic disc substrate, following characteristics are requested.

(1) To be a type not necessitating the heat treatment and to have sufficient strength to endure the high-speed rotation at the time of various processing and use.

(2) To be light-weight, to be capable of obtaining good mirror-like surface by polishing and not to appear the surface defects such as pits etc.

(3) To be excellent in the adhesion of electroless plating being the priming treatment and the smoothness of surface and not to appear the defects such as pits etc. also after plating.

As a substrate for the magnetic disc satisfying such characteristics, JIS A5086 alloy (Mg 3.5–4.5 wt. %, Fe≦0.50 wt. %, Si≦0.40 wt. %, Mn 0.20–0.7 wt. %, Cr 0.05–0.25 wt. %, Cu ≦0.10 wt. %, Ti≦0.15 wt. %, Zn≦0.25 wt. % and the remainder Al) or an alloy in which the intermetallic compounds produced in the matrix are made smaller by regulating Fe, Si, etc. being impurities in JIS A5086 alloy is used.

With the substrate comprising said JIS A5086 alloy, however, because of the poor adhesion of electroless plating being the priming treatment for covering with magnetic substance, there has been a problem that the covering of electroless plating is sometimes peeled off in the coating process with magnetic substance or during use. Moreover, the surface smoothness after electroless plating cannot also be said to be sufficient. Namely, the intermetallic compounds drop out at the time of zincate treatment to produce pits. These pits disappear in many cases by subsequent polishing if the thickness of electroless plating is as thick as 20 μm, but, because of the recent tendency to make the plating thickness thinner (for example, 17 μm), such a case that the pits are left behind also after polishing subsequent to plating has been caused. Moreover, the plate of aluminum alloy is punched out to a fixed size and then submitted to cutting or grinding polishing. At this time, the intermetallic compounds drop out in some cases to become pit defect. As described, for the improvement in the palatability of magnetic disc, it has been earnestly desired to decrease mainly the number of the intermetallic compounds of aluminum alloy for the substrate and also to make the size smaller. Various measures have been taken for this, but sufficient results are not necessarily achieved.

Furthermore, the corrosion resistance of the magnetic disc substrate is also one of the important characteristics, but this could not be said to be sufficient hitherto. As a result of various investigations by the inventors, it has become clear that, as the causes to lower said corrosion resistance, minute defects in the film of plating also affect significantly together with the corrosion resistance of Al substrate.

In consequence of extensive investigations in view of said problems, ti has been known that, for the adhesion of the electroless plating with Ni-P alloy and the smoothness of the plated surface, it is necessary to adhere the zincate film of pretreatment thinly, uniformly and densely, and further that the adhesion of the plated film with Ni-P alloy is affected not only by the adhering situation of zincate film but also by the diameter of crystal grains in the material and the trace elements to be added in the matrix, that is, if the crystal grains are minute, the adhesion is enhanced, and the adhesion and the minute defects in the plated film are improved also by controlling the type and quantity of trace elements to be added. After further investigation, the aluminum alloy for the magnetic disc substrate has been developed according to the invention, wherein, by combining said effects if need by, the interactions therebetween can be obtained and, as a result, the adhesion of electroless plating being the priming plating is excellent, yet plated surface is smooth, there are no surface defects, and the corrosion resistance of plated substrate is also excellent.

SUMMARY OF THE INVENTION

One of the alloys of the invention (A) is an aluminum alloy for magnetic disc substrate excellent in the platability, characterized in that not less than 0.010 wt. % and under 0.03 wt. % of Cu, not less than 2 wt. % and not more than 6 wt. % of Mg and not less than 0.05 wt. % and not more than 2.0 wt. % of Zn are contained, further one or more of over 0.01 wt. % and under 0.05 wt. % of Mn and over 0.01 wt. % and under 0.05 wt. % of Cr and contained, and, as impurity elements, Si, Fe, Ti and other individual unavoidable element are regulated to be not more than 0.1 wt. %, not more than 0.1 wt. %, not more than 0.02 wt. % and not more than 0.02 wt. %, respectively. Other one of the alloys of the invention (B) is an aluminum alloy for magnetic disc substrate excellent in the platability, characterized in that not less than 0.010 wt. % and under 0.03 wt. % of Cu, not less than 2 wt. % and not more than 6 wt. % of Mg, not less than 0.05 wt. % and not more than 2.0 wt. % of Zn and not less than 0.005 wt. % and under 0.05 wt. % of Zr are contained, further one or more of over 0.01 wt. % and under 0.05 wt. % of Mn and over 0.01 wt. % and under 0.05 wt. % of Cr are contained, and as impurity elements, Si, Fe, Ti and other individual unavoidable element are regulated to be not more than 0.1 wt. %, not more than 0.1 wt. %, not more than 0.02 wt. % and not more than 0.02 wt. %, respectively.

DETAILED DESCRIPTION OF THE INVENTION

In following, the significance of the elements to be added and the reason for the restriction of alloy compositions in the alloys of the invention will be illustrated (hereinafter, wt. % in alloy composition is abbreviated simply %).

Mg is added to obtain mainly the strength and the reason why the content thereof was restricted to not less than 2% and not more than 6% is due to that, if under 2%, sufficient strength cannot be obtained and, if over 6%, the Al-Mg intermetallic compound is produced and simultaneously the formation of nonmetallic intervenients such as MgO becomes remarkable through the high-temperature oxidation on the melting and casting resulting in the cause of occurrence of defectives due to pits.

Zn makes the zincate treatment possible and the reason why the content thereof was restricted to not less than 0.05% and not more than 2.0% is due to that, if under 0.05%, the effect of zincate treatment becomes insufficient and, if over 2.0%, the rolling processibility and the corrosion resistance are lowered and particularly the corrosion resistance of the material is poor also in the plating process, thereby the zincate treatment becomes nonuniform and the adhesion of plating and the smoothness of surface are lowered. Besides, by establishing the content of Zn within said range, the dissolving amount of Al is decreased at the time of zincate treatment and the smoothness at the subsequent electroless plating can be raised.

Figure 1A:
Figure 1B:
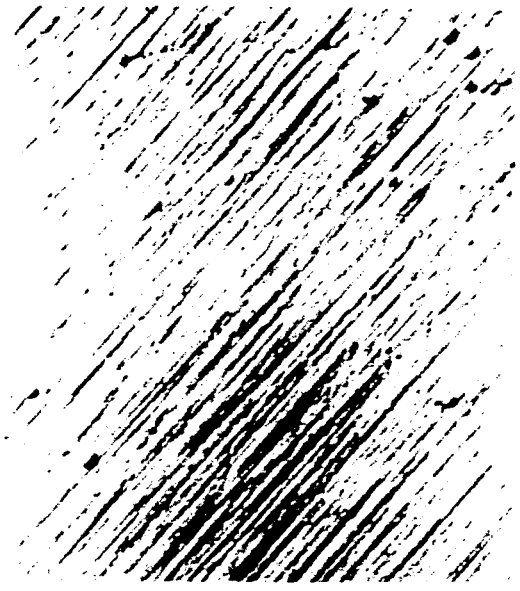
Figure 1C:
Figure 1D:
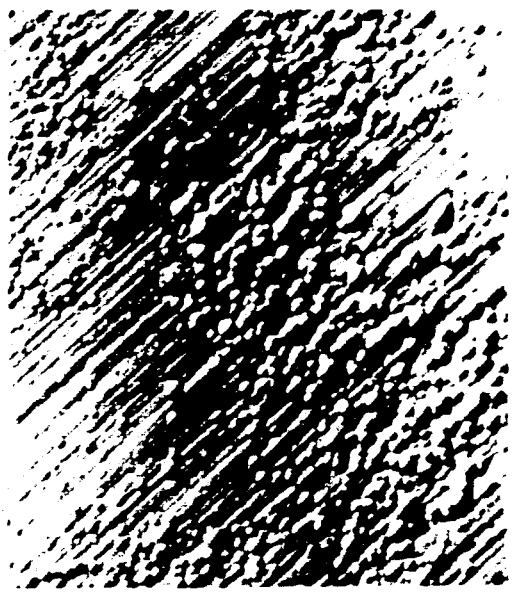

The addition of Cu is for the reason that the dissolving amount of Al at the time of zincate treatment is decreased, further the zincate film is adhered thinly, uniformly and densely to enhance the surface smoothness of subsequent electroless plating and simultaneously minute defects in the plated film are decreased to produce a sound film, thereby the corrosion resistance of plated substrate being an important characteristic of plated substrate is sufficiently satisfied. The reason why the content of Cu was restricted to not less than 0.010% and under 0.03% in (A) and (B) of the alloys of the invention is because of that, if under 0.010%, the improvement effect on the corrosion resistance of plated substrate is less and, if becoming 0.03% or more, the corrosion resistance of the material itself is lowered significantly and particularly the corrosion resistance of the material itself is poor in the plating process, thereby the zincate treatment becomes nonuniform and the adhesion of plating and the smoothness of surface become poor. Photographs of FIG. 1 (A) (B) (C) and (D) show appearances of alloys (X 500, photographs by optical microscope) wherein varied amounts of 0%, 0.02%, 0.05% and 0.15% Cu were added into a base alloy of Al - 4.0% Mg - 0.5% Zn - 0.03% Mn - 0.03% Cr respectively and the produced alloys were subjected to plating.

The alloy of 0% Cu, i.e. without addition of Cu among the above alloys shows an appearance to be rough on the all surface thereof, while the alloy with addition of 0.02% Cu gives an appearance of smooth surface.

However, the roughness of surface thereof gradually appears as the addition amount of Cu increases. An appearance of the alloy with addition of 0.05% Cu is a little more rough than that with addition of 0.02% Cu, and the roughness thereof can be remarkably recognized when the addition amount of Cu reaches 0.15%.

Mn, Cr and Zr deposit as minute compounds at the time of homogenizing treatment of ingot and/or hot rolling and annealing. A part thereof is brought to the solid solution in the matrix to enhance the strength and makes the recrystallized grains fine, thereby they exert the effect to enhance the adhesion of electroless plating and contribute to the improvement in the cutting and polishing properties of aluminum alloy substrate and the improvement in the adhesion of Ni-P plating film through the interaction therebetween. The reason why the levels thereof were restricted respectively to said ranges is because of that, if under lower limits, said effects are insufficient and, if over upper limits, not only excess elements are removed during the treatment of melt through filter on casting resulting in vain effort but also coarse intermetallic compounds are produced and drop out on cutting and polishing as well as on alkali etching and zincate treatment to cause the pit defect.

Thereamong, Mn and Cr may exert the effects even if added independently, by larger effects can be achieved by adding in combination. Since sufficient effects cannot be achieved with Zr added independently compared with Mn and Cr, it is necessary to add it in combination with Mn and/or Cr and, in such a case, larger effects can be achieved than the case of adding Mn and/or Cr.

The reason why Fe and Si were restricted to not more than 0.1%, respectively, is because of that Fe and Si are hardly brought to the solid solution in aluminum to deposit as intermetallic compounds, and, when rich in quantities thereof, a number of coarse intermetallic compounds of the types of Al-Fe, Al-Fe-Si, etc. exist and drop out on cutting and polishing of substrate and on zincate treatment to tend to cause the pit defect.

Moreover, other unavoidable impurity elements (e.g. Ni, V, B, etc.) do not affect on the characteristics of the alloys of the invention if not more than 0.02%, respectively.

Besides, with respect to the intermetallic compounds contained in the texture of the alloys of the invention, it is desirable to make the maximum diameter not more than 15 $\mu$m. The intermetallic compounds drop out not only on alkali etching and zincate treatment but also on cutting and polishing of aluminum alloy substrate to cause the pit defect, but this can be covered considerably during subsequent electroless plating and further, after the polishing of plate substrate, the pit defect becomes considerably smaller in size than that of real intermetallic compounds. Currently, in the movement to high density and large capacity, the characteristics required for the disc substrate are also elevated and the situation is that, for example, in 3.5" disc substrate, a pit exceeding a diameter of 5 $\mu$m is not forgiven in the surface after plating and subsequent polishing. As a result of extensive investigations, the inventors have known that, in order to make the maximum diameter of pit in the surface after plating and subsequent polishing not more than 5 $\mu$m, the maximum diameter of intermetallic compound in aluminum alloy must be made not more than 15 $\mu$m. Moreover, the diameter of pit differs also depending on the thickness of film after plating and subsequent polishing. When, at least, the thickness of plated film is not less than 10 $\mu$m after plating and subsequent polishing, if the maximum diameter of intermetallic compound in alloy is not more than 15 $\mu$m, it is possible to make the maximum diameter of pit after plating and subsequent polishing not more than 5 μm.

Besides, the alloy of the invention can be used enough not only for the substrate to be primed with plating but also for conventional substrate of coating type.

Examples 1–17 and Comparative Examples 18–45 A commercial Al metal with a purity of more than 99.5% was molten and alloy elements were added to this to prepare the alloy melts with composition shown in Table 1. After degassing, setting and filtering through filter, the melts were casted under cooling with water to obtain ingots with a thickness of 350 mm, a width of 1000 mm and a length of 2000 mm. Both sides of these ingots were shaven each by 10 mm and then the ingots were subject to the soaking treatment for about 6 hours at a temperature of 480±30° C. Thereafter, they were subject to the hot rolling and cold rolling according to ordinary method to obtain plates with a thickness of 1.5 mm.

From these plates, discs with a diameter of 95 mm were punched out and, after annealed for 2 hours at 35020° C., rough polishing and finish polishing were given to finish to mirror-like surface. These discs were degreased with commercial solvent and etched for 30 seconds at 40° C. with 5% aqueous solution of NaOH and then smuts were removed for 30 seconds at room temperature with 30% aqueous solution of $HNO_3$. Thereafter, the maximum diameter of intermetallic compounds was determined. Successively, zincate treatment and then electroless plating with Ni-P alloy were performed and further finish polishing was made. Thereafter, the adhesion of plated film, smoothness of surface and pit defect were examined. These results were compared with those of conventional JIS A5086 alloy (Mg 4%, Mn 0.5%, Cr 0.2%, Fe 0.3%, Si 0.05%, Ti0.01%, Zn 0.01%, and the remainder Al) and put down in Table 1.

Besides, for the zincate treatment, double zincate treatment was carried out using Arb 302ZN (trade name, Okuno Pharmaceutical) and, for the electroless plating with Ni-P alloy, Ny clad 719 (trade name,

TABLE 1

| No. | Chemical composition (wt. %) | | | | | | | | | Other impurities and Al | Maximum diameter of intermetallic compound (μm) | Adhesion | Surface roughness Ra (μm) | Surface defects | Hydrochloric acid resistance |
| --- | --- | --- | --- | --- | --- | --- | --- | --- | --- | --- | --- | --- | --- | --- | --- |
| | Mg | Cu | Zn | Mn | Cr | Zr | Si | Fe | Ti | | | | | | |
| Alloy of the invention | | | | | | | | | | | | | | | |
| 1 | 3.2 | 0.015 | 1.03 | 0.025 | — | — | 0.03 | 0.01 | 0.003 | Balance | 3.2 | O | 0.002 | O | O |
| 2 | 3.6 | 0.011 | 1.90 | — | 0.018 | — | 0.05 | 0.04 | 0.002 | " | 4.6 | O | 0.003 | O | O |
| 3 | 4.1 | 0.020 | 0.65 | 0.030 | 0.025 | — | 0.04 | 0.05 | 0.001 | " | 4.8 | O | 0.002 | O | O |
| 4 | 3.5 | 0.027 | 0.06 | — | 0.016 | 0.007 | 0.07 | 0.06 | 0.016 | " | 6.3 | O | 0.003 | O | O |
| 5 | 4.3 | 0.019 | 1.34 | 0.011 | — | 0.028 | 0.08 | 0.08 | 0.012 | " | 7.6 | O | 0.002 | O | O |
| 6 | 2.2 | 0.012 | 0.08 | 0.015 | 0.013 | 0.009 | 0.03 | 0.04 | 0.001 | " | 5.8 | O | 0.002 | O | O |
| 7 | 4.8 | 0.015 | 0.10 | 0.018 | 0.012 | 0.044 | 0.02 | 0.05 | 0.015 | " | 6.5 | O | 0.003 | O | O |
| 8 | 3.5 | 0.023 | 0.23 | 0.016 | 0.038 | 0.026 | 0.03 | 0.05 | 0.006 | " | 5.6 | O | 0.002 | O | O |
| 9 | 4.0 | 0.011 | 1.07 | 0.034 | 0.021 | 0.035 | 0.04 | 0.07 | 0.002 | " | 9.7 | O | 0.001 | O | O |
| 10 | 4.2 | 0.012 | 0.84 | 0.031 | 0.025 | 0.010 | 0.03 | 0.04 | 0.005 | " | 8.2 | O | 0.002 | O | O |
| 11 | 3.5 | 0.017 | 0.98 | 0.026 | 0.036 | 0.038 | 0.07 | 0.08 | 0.017 | " | 10.2 | O | 0.003 | O | O |
| 12 | 4.0 | 0.020 | 0.65 | 0.030 | 0.029 | — | 0.04 | 0.05 | 0.001 | " | 7.5 | O | 0.003 | O | O |
| 13 | 4.2 | 0.022 | 0.75 | 0.008 | 0.036 | 0.016 | 0.03 | 0.04 | 0.006 | " | 5.3 | O | 0.002 | O | O |
| 14 | 2.6 | 0.020 | 0.88 | 0.037 | 0.017 | — | 0.06 | 0.02 | 0.003 | " | 4.6 | O | 0.003 | O | O |
| 15 | 4.1 | 0.024 | 1.87 | 0.014 | 0.021 | 0.027 | 0.04 | 0.05 | 0.011 | " | 6.4 | O | 0.002 | O | O |
| 16 | 4.7 | 0.018 | 0.83 | 0.025 | 0.011 | — | 0.02 | 0.03 | 0.013 | " | 5.6 | O | 0.002 | O | O |
| 17 | 3.9 | 0.020 | 0.65 | — | 0.028 | 0.010 | 0.03 | 0.04 | 0.001 | " | 6.5 | O | 0.003 | O | O |
| Comparative alloy | | | | | | | | | | | | | | | |
| 18 | 3.6 | 0.035 | 0.08 | — | — | — | 0.06 | 0.08 | 0.010 | Balance | 6.8 | X | 0.018 | O | Δ |
| 19 | 4.2 | 0.005 | 0.68 | — | — | — | 0.03 | 0.05 | 0.003 | " | 5.6 | Δ | 0.003 | O | X |
| 20 | 3.5 | 0.025 | 2.18 | — | — | — | 0.04 | 0.04 | 0.001 | " | 4.8 | X | 0.019 | O | O |
| 21 | 2.8 | 0.011 | 0.02 | — | — | — | 0.02 | 0.03 | 0.016 | " | 4.5 | Δ | 0.017 | O | O |
| 22 | 4.7 | 0.038 | 2.54 | — | — | — | 0.03 | 0.02 | 0.003 | " | 4.1 | X | 0.018 | O | Δ |
| 23 | 3.6 | 0.023 | 1.50 | 0.052 | — | — | 0.04 | 0.03 | 0.008 | " | 19.7 | O | 0.003 | X | O |
| 24 | 4.0 | 0.018 | 1.01 | — | 0.048 | — | 0.02 | 0.05 | 0.011 | " | 16.2 | O | 0.002 | X | O |
| 25 | 3.9 | 0.025 | 0.09 | — | — | 0.057 | 0.03 | 0.15 | 0.003 | " | 16.8 | Δ | 0.003 | X | O |
| 26 | 2.2 | 0.022 | 1.57 | 0.066 | — | — | 0.12 | 0.06 | 0.006 | " | 17.5 | O | 0.003 | X | O |
| 27 | 4.8 | 0.013 | 1.89 | 0.041 | — | — | 0.06 | 0.13 | 0.04 | " | 21.6 | O | 0.002 | X | O |
| 28 | 3.5 | 0.032 | 0.07 | 0.055 | 0.026 | — | 0.04 | 0.05 | 0.018 | " | 18.7 | X | 0.017 | X | Δ |
| 29 | 4.2 | 0.017 | 0.02 | — | 0.051 | 0.013 | 0.02 | 0.01 | 0.012 | " | 19.5 | Δ | 0.016 | X | O |
| 30 | 4.0 | 0.002 | 0.03 | 0.026 | — | 0.030 | 0.16 | 0.06 | 0.003 | " | 20.0 | X | 0.018 | X | X |
| 31 | 3.5 | 0.018 | 2.26 | 0.035 | 0.032 | 0.061 | 0.03 | 0.04 | 0.04 | " | 21.2 | X | 0.020 | X | O |
| 32 | 3.8 | 0.032 | 0.36 | 0.028 | — | 0.026 | 0.06 | 0.03 | 0.011 | " | 6.3 | X | 0.022 | O | Δ |
| 33 | 4.0 | 0.015 | 2.57 | — | 0.009 | 0.012 | 0.03 | 0.04 | 0.002 | " | 5.8 | X | 0.019 | O | O |
| 34 | 2.7 | 0.012 | 0.75 | 0.051 | — | 0.038 | 0.05 | 0.06 | 0.006 | " | 17.3 | O | 0.003 | X | O |
| 35 | 4.7 | 0.021 | 1.32 | 0.026 | 0.045 | 0.030 | 0.07 | 0.08 | 0.015 | " | 19.6 | O | 0.003 | X | O |
| 36 | 3.5 | 0.023 | 0.07 | 0.036 | 0.016 | 0.022 | 0.16 | 0.03 | 0.003 | " | 20.2 | O | 0.002 | X | O |
| 37 | 2.2 | 0.018 | 1.02 | 0.031 | 0.028 | 0.009 | 0.03 | 0.12 | 0.033 | " | 22.7 | O | 0.003 | X | O |
| 38 | 4.8 | 0.006 | 0.09 | 0.026 | 0.015 | 0.008 | 0.04 | 0.04 | 0.002 | " | 6.0 | O | 0.003 | O | X |
| 39 | 3.7 | 0.022 | 0.04 | 0.011 | 0.018 | 0.016 | 0.06 | 0.07 | 0.003 | " | 5.8 | Δ | 0.018 | O | O |
| 40 | 4.1 | 0.023 | 1.01 | 0.056 | 0.048 | 0.052 | 0.02 | 0.03 | 0.003 | " | 25.3 | O | 0.002 | X | O |
| 41 | 3.4 | 0.017 | 0.08 | 0.065 | 0.061 | 0.032 | 0.03 | 0.04 | 0.011 | " | 19.9 | O | 0.002 | X | O |
| 42 | 4.2 | 0.035 | 0.72 | 0.041 | 0.015 | 0.018 | 0.05 | 0.03 | 0.004 | " | 18.7 | X | 0.018 | X | Δ |
| 43 | 2.2 | 0.018 | 2.31 | 0.031 | 0.051 | 0.026 | 0.02 | 0.06 | 0.012 | " | 17.5 | X | 0.020 | X | O |
| 44 | 3.1 | 0.038 | 1.00 | 0.025 | 0.047 | 0.025 | 0.12 | 0.03 | 0.002 | " | 19.4 | X | 0.018 | X | Δ |
| 45 | 3.8 | 0.024 | 0.02 | 0.051 | 0.055 | 0.063 | 0.02 | 0.14 | 0.03 | " | 23.8 | Δ | 0.017 | X | O |
| Conventional alloy | | | | | | | | | | | | | | | |
| JIS A5086 alloy | | | | | | | | | | | 18.2 | X | 0.019 | X | X |

(Note) Amount of mark - in Table is 0.000 wt. % or less

Okuno Pharmaceutical) was used. The thickness of electroless Ni-P plating was made 17 μm and a margin of 4 μm was left for subsequent finish polishing (buffing) to finish to the thickness of 13 μm.

With respect to the adhesion, samples with 50 mm square were cut out after polishing of plating, heated for 30 minutes at a temperature of 400° C. and cooled immediately with water of ordinary temperature to examine the peeling-off and blistering of plating due to the difference in thermal expansion between Al alloy and Ni-P alloy, wherein one without peeling-off or blistering was marked with O, one with that slightly generated was marked with Δ and one with that generated in great numbers was marked with X (one with O is acceptable and one with Δ or X is unacceptable). Moreover, with respect to the smoothness, the surface roughness after polishing of plating was measured by the use of Universal Surface Roughness Tester SE-3H (made by Kosaka Laboratory) and the average value of four measurements of center line average height Ra (μm) prescribed in JIS B0601 was shown. With respect to the extent of surface defects, the surface of plated substrate was observed under optical microscope after final finish polishing (polishing of plating), wherein a case of existing pit with maximum diameter exceeding 5 μm was marked with X and case of the maximum diameter being not more than 5 μm despite the existence of pits was marked with O. Furthermore, with respect to the corrosion resistance of plated substrate, evaluation was made by the test of hydrochloric acid resistance (immersion for 24 hours at room temperature into 1N solution of hydrochloric acid), wherein one without peeling-off or blistering in the plated film was marked with O, one with that slightly generated was marked with Δ, and one with that generated in great numbers was marked with X (one with O is acceptable and one with Δ or X is unacceptable).

As evident from Table 1, it can be seen that the alloy of the invention occur virtually no defectives due to pits and are excellent in the characteristics such as adhesion, smoothness, corrosion resistance, etc. when used as plating substrates. Whereas, with comparative materials out of the ranges of the invention or JIS A5086 alloy being conventional material, either of the characteristics of adhesion, surface smoothness, surface defects and corrosion resistance is seen to be worsened.

As described, when using the alloy of the invention as the magnetic disc substrates for plating, the adhesion of electroless plating being the priming treatment is excellent, yet the surface after finished the plating is smooth and as no defects, and the corrosion resistance of substrate after plating is also excellent. The invention therefore excerts conspicuous effect industrially in making the large capacity and high density of magnetic disc possible and in others.

What is claimed is:

1. An aluminum alloy for use as a magnetic disc substrate consisting essentially of aluminum and from 0.01–0.03 wt. % of copper, from 2.0–6.0 wt. % of magnesium, from 0.05–2.0 wt. % of zinc, and from 0.01–0.05 wt. % of at least one member of the group consisting of manganese and chromium, wherein said alloy contains as impurities no greater than 0.1 wt. % of silicon, no greater than 0.1 wt. % of iron, no greater than 0.02 wt. % of titanium and no greater than 0.02 wt. % of any other individual impurity.

2. An aluminum alloy for use as a magnetic disc substrate consisting essentially of aluminum and from 0.01–0.03 wt. % of copper, from 2.0–6.0 wt. % of magnesium, from 0.5–2.0 wt. % of zinc, from 0.005–0.05 wt. % of zirconium, from 0.01–0.05 wt. % of at least one member of the group consisting of manganese and chromium, wherein said alloy contains as impurities no greater than 0.1 wt. % of silicon, no greater than 0.1 wt. % of iron, no greater than 0.02 wt. % of titanium and no greater than 0.02 wt. % of any other individual impurity.

* * * * *